(12) United States Patent
Hiebert

(10) Patent No.: US 7,430,812 B2
(45) Date of Patent: Oct. 7, 2008

(54) HOSE ANGLE PROTRACTOR

(75) Inventor: Ross W. Hiebert, Newton, KS (US)

(73) Assignee: Austin Distributing & Manufacturing Corporation, Wichita, KS (US)

( * ) Notice: Subject to any disclaimer, the term of this patent is extended or adjusted under 35 U.S.C. 154(b) by 59 days.

(21) Appl. No.: 11/380,319

(22) Filed: Apr. 26, 2006

(65) Prior Publication Data
US 2007/0251110 A1 Nov. 1, 2007

(51) Int. Cl.
*G01B 3/00* (2006.01)
(52) U.S. Cl. .............................. 33/549; 33/529; 33/534
(58) Field of Classification Search .................. 33/549, 33/551, 529, 534, 538, 412, 568, 571, 573, 33/1 G, 1 N, 1 BB, 613, 645, 562, 563, 566, 33/21.3
See application file for complete search history.

(56) References Cited

U.S. PATENT DOCUMENTS

| | | | | |
|---|---|---|---|---|
| 2,636,273 | A | * | 4/1953 | Morris ........................ 33/281 |
| 2,699,601 | A | * | 1/1955 | Darnell ........................ 269/40 |
| 2,802,440 | A | * | 8/1957 | Allen ........................ 269/165 |
| 2,832,152 | A | * | 4/1958 | Blackshaw .................... 33/529 |
| 2,832,153 | A | * | 4/1958 | Binckley ..................... 33/529 |
| 2,853,771 | A | * | 9/1958 | Melville ...................... 269/9 |
| 3,365,804 | A | * | 1/1968 | Gottfrid ....................... 33/529 |
| 3,545,089 | A | * | 12/1970 | Beckwell ..................... 33/529 |
| 4,497,119 | A | | 2/1985 | Dearman |
| 4,593,476 | A | * | 6/1986 | Clark et al. .................... 33/529 |
| 4,604,813 | A | * | 8/1986 | Kawanami et al. ............ 33/529 |
| 4,766,675 | A | | 8/1988 | Liu |
| 5,312,096 | A | * | 5/1994 | Jasper .......................... 269/43 |
| 5,461,791 | A | * | 10/1995 | Piety ............................ 33/1 N |
| 6,505,412 | B2 | * | 1/2003 | Hauzie, Jr. ................... 33/529 |
| 6,634,190 | B2 | | 10/2003 | Didier-Laurent |
| 7,178,252 | B1 | * | 2/2007 | Belgard ....................... 33/412 |

OTHER PUBLICATIONS

Parker Hannifin Corporation, "Stratoflex 156 Hose Produche For Aerospace Industry," Catalog 106-168, p. 1-33, Oct. 2002.
Austin Distributing and Manufacturing Corp., "Twist Angle Information," p. 14, Unknown Publication Date.

* cited by examiner

*Primary Examiner*—G. Bradley Bennett
*Assistant Examiner*—Amy Cohen Johnson
(74) *Attorney, Agent, or Firm*—Lathrop & Gage LC

(57) ABSTRACT

Disclosed is a device used to set twist angles. The device include a set plate which is supported at one end and a protractor plate at a second end. The hose is placed in position atop the two supports and the hose placed on top of the supports with couplers at each end. The user then clamps the first coupler in a horizontal position pointing toward one of two sides of the set plate. This is used as a reference from which a twist angle may be set at the other side of the tool. The other side of the tool includes a protractor in such a way that the elbow can be rotated in position relative to one of two scales. These two scales are color coded such that for acute angles, the user will know to point the first end horizontally in the red (?) direction and for obtuse angles the user will point the coupler in the blue direction. Depending on which color the user selects will match it up and the elbow twist angles will be properly set. The hose is easily unclamped from the device and crimped.

18 Claims, 5 Drawing Sheets

HOSE ANGLE PROTRACTOR

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to the field of hydraulic hose manufacture. More specifically, the present invention is a technique of determining twist angles when crimping elbows on each end of a hose section.

2. Description of the Related Art

Hydraulic hose is widely used for the purpose of containing and conducting hydraulic fluid under pressure in many different environments, e.g., farm equipment, control systems, and numerous other applications. For most uses, connectors are included at each end of a unit of hose. These connectors are coupled to the hose ends by crimping. The arrangement on each elbow includes an internal collar which is inserted inside of the hose and engages the inside surface of the hose, and an outer shell which is compressed down onto the outer diameter of the hose end by a crimping machine. A crimping machine is a device which administers uniform diametric pressure around the shell to create the compression. Thus the outer shell is mashed inward on the outside of the hose smashing it between the shell and internal collar. Once the crimp is made, the machine jaws are released. The result is an elbow which is coupled to the hose end such that it will not slide out of the hose or rotate inside of the hose like before the crimp. Further, a fluid seal is created.

For many applications, the end connectors will be manufactured such that they extend directly out axially from each end of the hose segment. In other situations, it will be desirable to manufacture a hose with connectors which at one or both ends are elbowed at 90 or 45 degrees. This is desirable where the hose is intended for use with non-axial reciprocating connectors on the hose-receiving equipment, control system, or other location in which the hose is to be installed.

When manufacturing double-elbowed hoses, it is extremely important to accurately determine the radial angle at which each elbow exists relative to the other so that the hose will properly fit with respect to the reciprocating couplers on the device the hose is intended to be used on. This radial angle is referred to in the art as the "twist angle." If the twist angle is not accurately measured during manufacture and before crimping, the error may lead to leaks or premature deterioration of the hose arrangement. In a worst-case scenario, the hose will not fit at all and will need to be thrown out and a new hose within proper tolerances be manufactured. Current SAE standards require that twist angles be accurate to within ±two degrees. This sometimes makes it difficult for the typical artisan to set the twist angles so that these tolerances are met.

The current method for measuring twist angles in the manufacture of double elbowed hose units works as follows: first, the hose is secured using a clamp or other mechanism. Next, an elbow at one end of the hose is set at horizontal. Note that the coupling portion of these connectors when inserted on the end of the pipe will tend to remain in position even though it is not yet crimped. This is because a precrimped stem applies a slight expanding force on the inside of the hose, the resulting friction makes it stay in place unless acted on. Though the coupler section is easily slid on and off of the hose or rotated about it axially, it will tend to stay in position when placed on the end unless subjected to some alien force, e.g., the user manipulating it with his hand.

Once the first end of the hose is set at zero degrees relative to horizontal, the user will go to the other end of the hose where the second elbow is to be installed. The second elbow will be placed on the hose end and is then ready to be adjusted to the appropriate twist angle.

The device commonly used in the prior art for accomplishing this task is a separate protractor device. This conventional protractor includes a level and is held up to the second end of the hose with one hand while the user manipulates the connector/coupler assembly so that the elbow is at the desired angle.

Though this process is capable of making dual elbowed hoses which fall within the industry standard two-degree tolerances, overall the process is less than ideal. First, it may take a skilled worker two to three minutes to properly set the twist angle for a particular hose portion. This may not sound like a large amount of time, but when the worker is manufacturing tens or hundreds of this kind of hose section, the time can add up significantly. Further, the level of exactness is dependant on numerous variables. One variable is the validity of the level on the protractor. If the level in the protractor is inaccurate, an improper horizontal for zero will result in error. Another variable is the skill of the worker in accurately eyeball fitting the collar angle versus horizontal (assuming the level on the protractor is accurate). Another variable which may lead to error is in setting up horizontal for zero initially at the first end. This also requires the worker to do an eyeball check rather than having some exact standard. Needless to say, the existence of these three variables makes the likelihood for error great, and in some cases unacceptably great.

Therefore, there is a need in the art for a system which enables a worker to accomplish the elbow crimping manufacturing process in a more timely fashion, while at the same time eliminating errors.

SUMMARY OF THE INVENTION

These prior art deficiencies are eliminated by the disclosed system and method. The system includes a device for setting twist angles on a hose having a first elbow at a first end of said hose and a second elbow at a second end of said hose. A clamping arrangement is provided for securing said hose coupling against rotation. Also provided is a first support surface for supporting a first end of said hose and enabling said first elbow at said first end of said hose to be set at a first reference angular position. A second support surface is also provided for supporting a second end of said hose. A first scale proximate said second end is adapted to enable a user to read and then set a first twist angle.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for setting twist angles on a hydraulic hose where two elbow connectors are installed one at each end of a hose section.

At one end, a vertically divided plate is color coded on first and second halves and a clamping mechanism is provided. The elbow at that end is clamped when the coupler is pointing at horizontal to the left (on the first half) for twist angles from 0 to 180 degrees and is clamped in at horizontal to the right (on the second half) for twist angles from 180 to 360 degrees.

At the other end, a double-scaled protractor is used to set the angle. A first scale is colored to match the same color as the first half of the vertically divided plate and is used to set twist angles between 0 and 180 degrees. The second scale is colored to match the same color as the second half of the vertically divided plate.

Once the elbows are set at the proper twist angle, the hose is released from the clamp and crimped.

Figure 1:
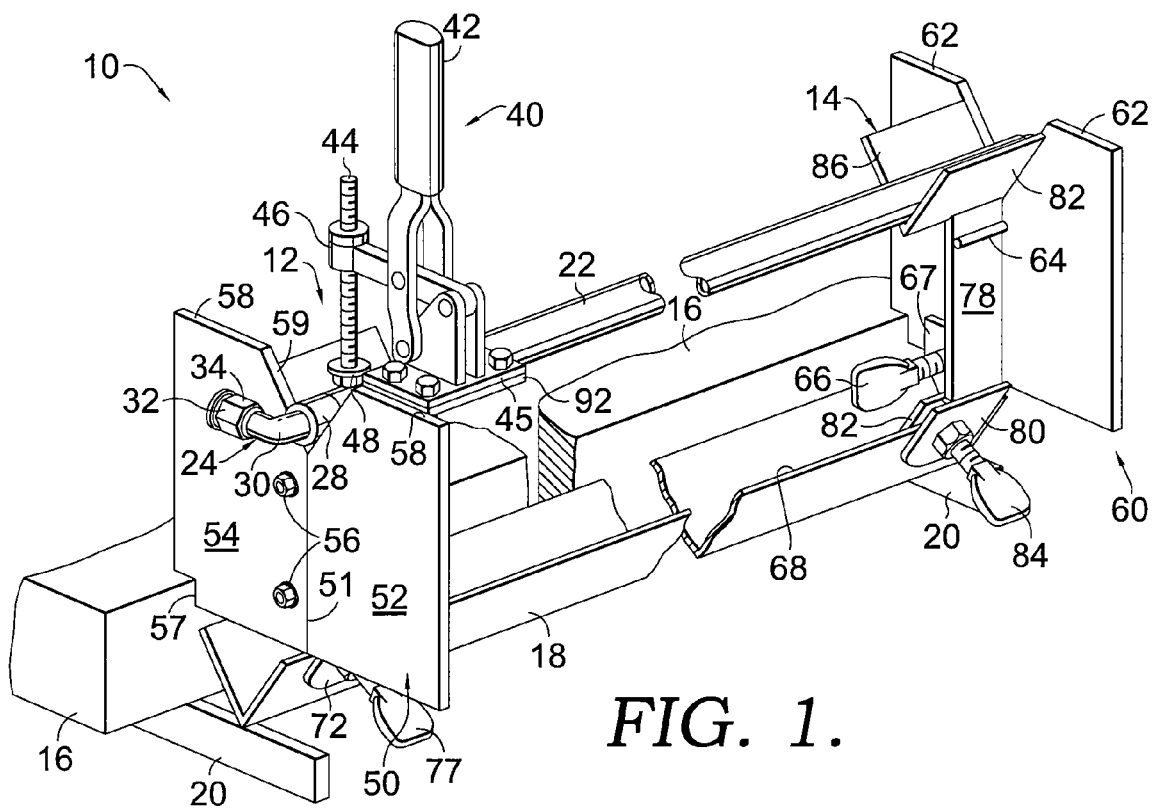
FIG. 1 shows a twist angle tool 10 of one embodiment of the present invention in perspective view when used to set the angles for couplers on a hose.

An embodiment for the twist angle tool of the present invention is disclosed in FIGS. 1-6. Referring first to FIGS. 1 through 4, a twist angle tool 10 includes a support which has a vertically divided plate 50 which is attached to the support using nuts 56. The entire device 10 is adapted to be mounted on to a table 16. Table 16 disclosed in FIG. 1 is shown as having outwardly extending bars 20 which are used to support a longitudinally extending angle iron 18. This angle iron 18 is commonly referred to a "trough" by those skilled in the art. As referenced above in the background section, this kind of trough has been used conventionally in working with hydraulic hose.

Figure 3:
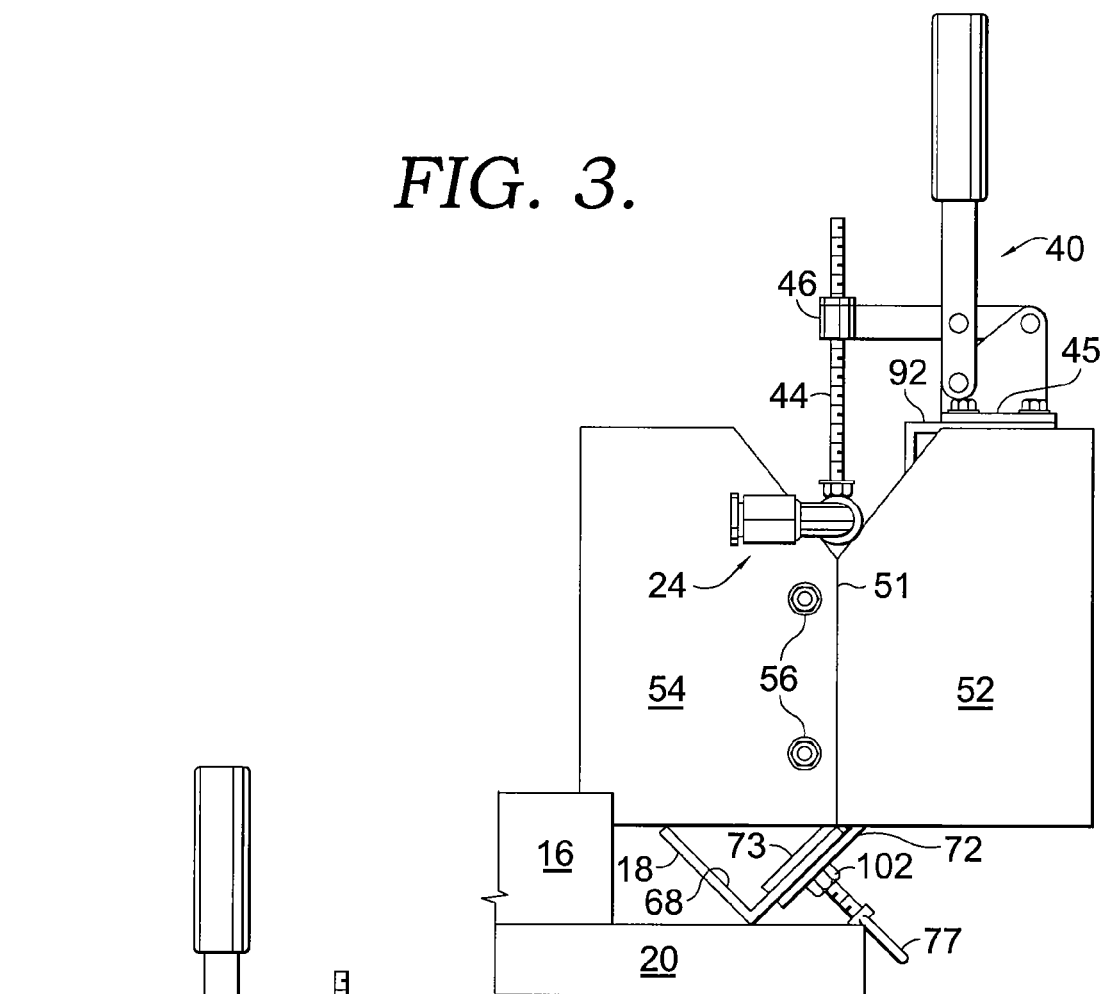
FIG. 3 shows a left-side view of the twist angle tool showing the set plate.
Figure 4:
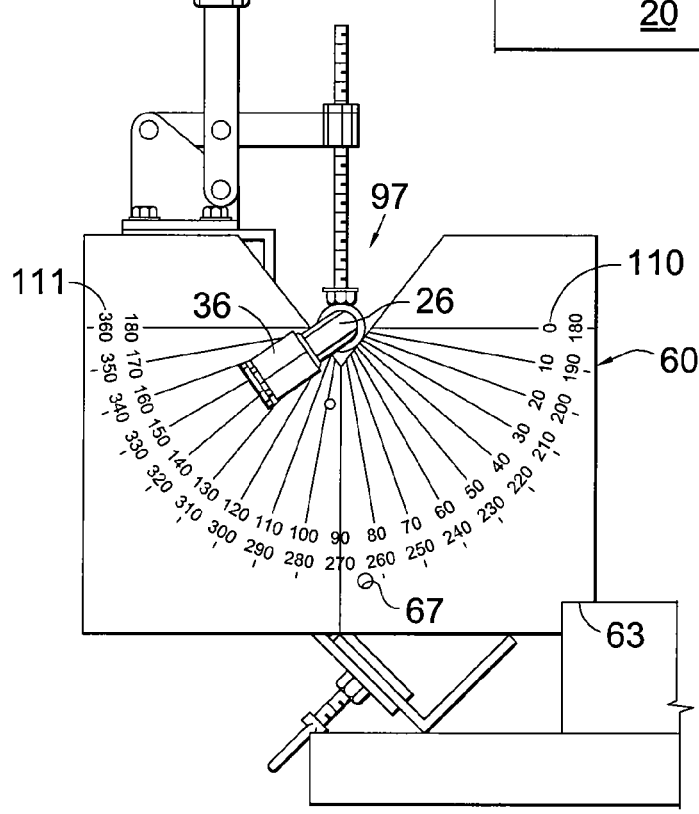
FIG. 4 shows a right-side view of the tool exposing the protractor plate side of the tool.
Figure 7:
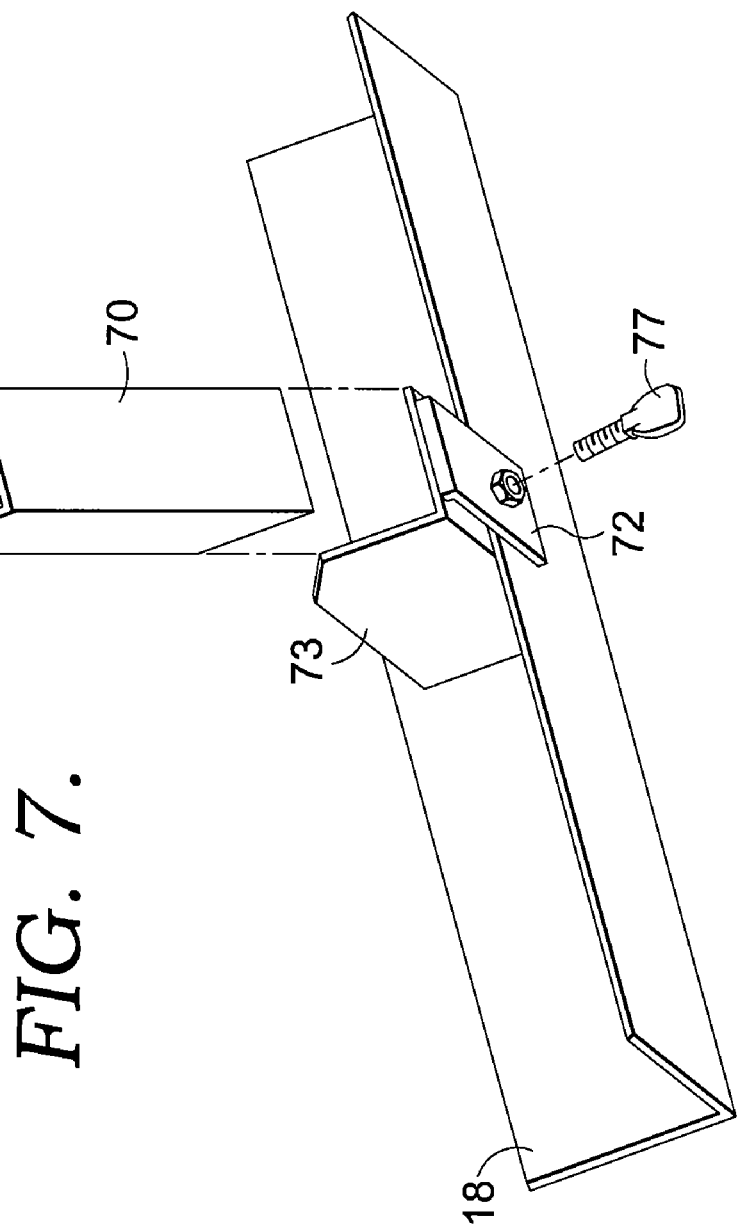
FIG. 7 shows an exploded view revealing the way in which the first support of the present invention is assembled.

Here, however, special supports have been adapted to be attached to the angle iron trough in order to accomplish the objectives herein. In the FIG. 1 embodiment it may be seen that two supports are used. On the left-hand side, a first support 12 is what set plate 50 is attached to using the bolts 56. The support itself includes a truncated piece of angle iron 76 which has a V-shaped cross section and extends longitudinally a short distance such that it is able to provide a hose-receiving area thereon. Below the hose-receiving member, a vertical support plate 70 extends down to a pair of welded plates 72 and 73 which together define a trough-receiving area which receives the outermost portion of the trough as shown in FIG. 3 and in even more detail in the exploded view of FIG. 7. Once the trough has been received between plates 72 and 73, a thumb screw 77 is provided on first member 12 so that the support may be secured to the outermost portion of trough 18.

On the top of the first support member 12 is a clamping arrangement. In the preferred embodiment, the clamping arrangement comprises a clamping mechanism 40. Clamping mechanisms like mechanism 40 will be known to those skilled in the art as something that is commercially available and referred to as a vertical-handle toggle clamp. The particular device used in the disclosed embodiment is an open arm, flanged base hold-down toggle clamp with an adjustable spindle location. The device is available under model number CL-150-VTC which is available from Carr Lane Manufacturing Co. at 4200 Carr Lane Ct. in St. Louis, Mo. But it should be understood that the use of the phrase "clamping arrangement" is not intended to imply limitation to any particular mechanism. Rather, any means of securing the hose against rotation when the elbows are manually rotated would fall within this definition.

In the preferred embodiment, clamp 40 has a handle 42 and is supported on a base 45. Also included is an adjustable threaded screw 44 which is received in a collar 46 which enables the screw to be tightened or loosened against a hose coupling 22 which is disposed in the receiving area 12 of the first support 12. Base 45 is bolted to a horizontally extending plate 92 which is a portion of a piece of angle iron which has been welded to an upper part of first support 12. (See FIG. 2.) A vertically, downwardly extending member 90 is made vertical by a welded small piece of angle iron 88 which is welded to the first support 12 such that it extends out to create two weld points which place the vertical portion 90 of the support member 12 in a position which will result in the base 45 being mounted substantially horizontally to horizontally extending portion 92.

Set plate 50 includes a horizontal upper edge 58 which has a V-shaped notch 59 removed from it such that it conforms in cross section to the angle iron that comprises the hose-receiving area. Set plate 50 also has a table receiving notch 57 which adapts the plate so that it clears table top 16. Plate 50 is permanently fixed to support 12 with bolts 56.

As mentioned already, set plate 50 is divided into two colored portions which are divided vertically by line 51. In the preferred embodiment, a half 54 on the left (as shown in FIG. 1) is blue and a half 52 on the right is red.

Figure 2:
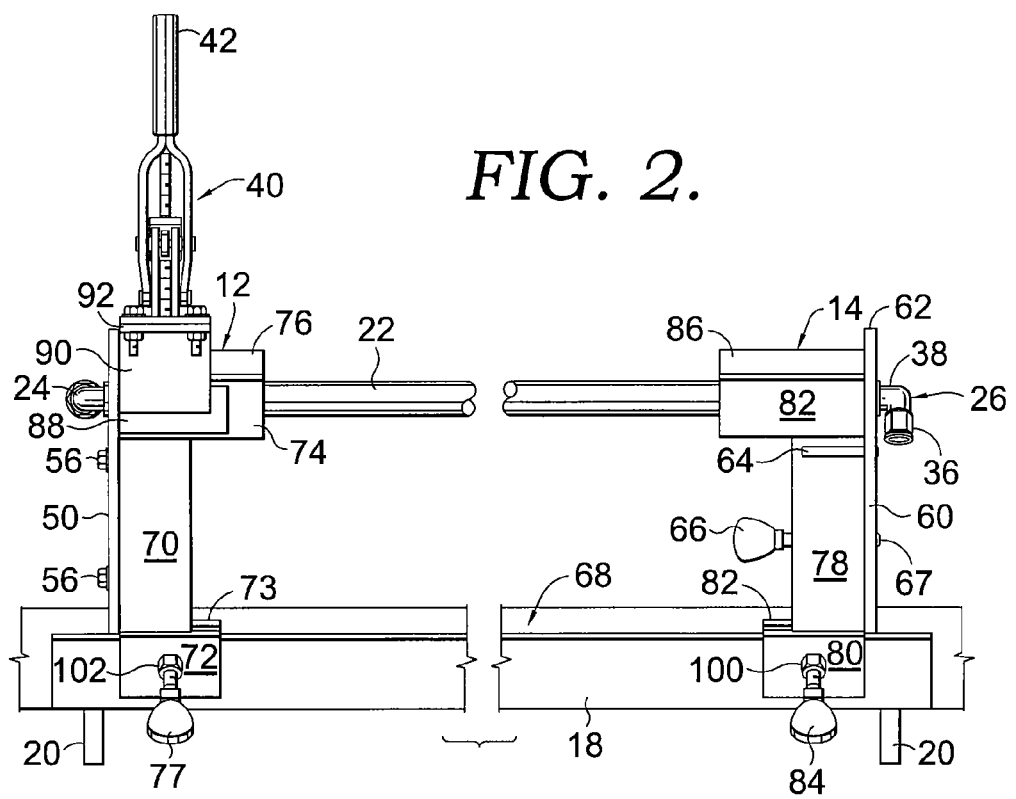
FIG. 2 shows a front view of the twist angle tool.

On the other/right side of the tool as seen in FIG. 2 is a second support 14. Second support 14 is used to support the hose on its other end and also includes a protractor 60 which will be used to measure the twist angles. Like with first support 12, second support 14 includes a truncated angle iron portion 82 which defines a receiving area 86 for the hose and also has a vertical angle iron 78 which is welded above welded angle iron 80 and plate 82 which define between them a receiving area for the outer portion of trough 18. Like with first support 12, second support 14 has a thumb screw 84 which is used to secure second support 14 to trough 18 such that it sticks up. An understanding of how second support is put together can be gleaned from FIG. 7 even though that figure does not disclose support 14. This is because support 14 is put together in the same way as support 12 (which is disclosed in FIG. 7) except that angle iron 78 and part 67 would each face the opposite direction and angle iron 82 would extend out from part 78 to the left as shown in FIG. 1.

Second support 14 includes two devices which are used to secure the protractor. The first is a pin 64 which extends through an aperture in the protractor plate to align the protractor plate. Also included is a thumb activator 66 which drives a screw arrangement 67 to engage and secure the protractor 60 to the second support 14 in a releasable manner. It is desirable that protractor plate 60 be easily releasable with this arrangement because different sizes of plates will be used for different sizes of a hose as will be explained in more detail hereinafter.

Like with the set plate 50, protractor plate 60 also has a V-shaped notch 97 which is removed out of an upper horizontal edge 62 of the plate 60. Protractor plate 60 has two separate angle indicator scales. A first indicator scale 110 is for twist angles between 0 and 180 degrees and a second scale 111 is for reading twist angles between 180 and 360 degrees.

These scales are also color coded corresponding to the colors on the set plate. Thus, setting a coupler at horizontal on the blue side 54 of set plate 50 will cause the user to use the blue-colored scale 110 on protractor plate 60 in order to set a 0-180 degree twist angle. Alternatively, setting the elbow at one end of the hose to horizontal on the red-plate side 52 of set plate 50 will cause the user to position the 180-360 degree twist angle using the red scale 111 shown on protractor plate 60.

Protractor plate 60 also has a notch 63. Notch 63 exists in plate 60 so that it clears the table top 16.

Figure 5:
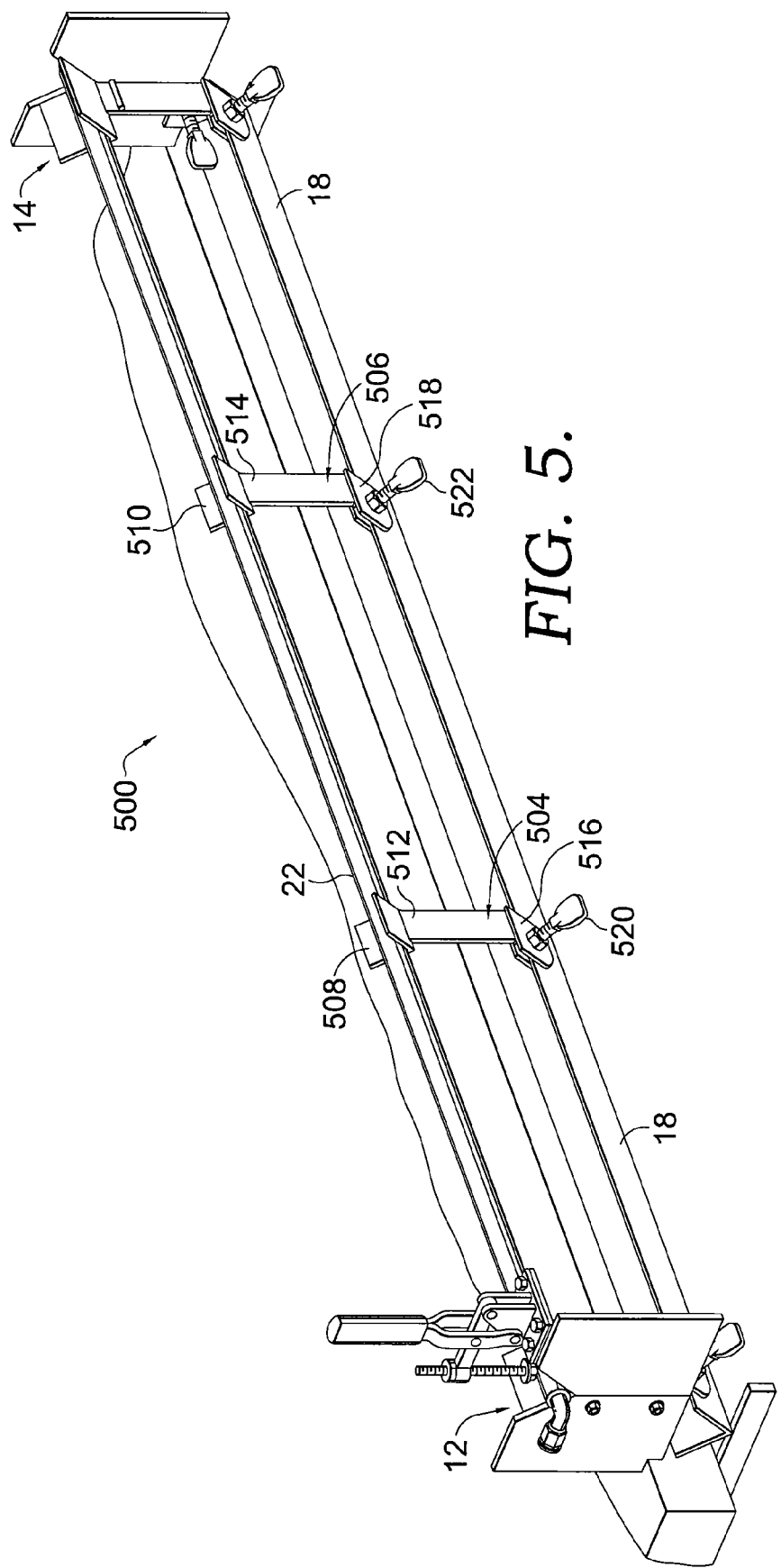
FIG. 5 shows the tool in perspective when used on a longer hose and utilizing auxiliary supports intermediate the two elbows.

FIG. 5 shows a situation where the hose 20 being manufactured is relatively long (e.g., 20 feet). In this situation, intermediate supports 504 and 506 are used so that the hose does not droop. Otherwise, it would be difficult to use the tool. Intermediate supports 504 and 506 are constructed much in the same manner as first and second supports 12 and 14 in that they are configured of truncated angle iron tops 508 and 510, vertical angle iron 512 and 514, and the same angle iron arrangements 516 and 518 which define receiving areas for the outer portion of the trough 18 with thumb screws 520 and 522 for the purpose of attaching to the trough in the same manner as with supports 12 and 14.

Figure 6:
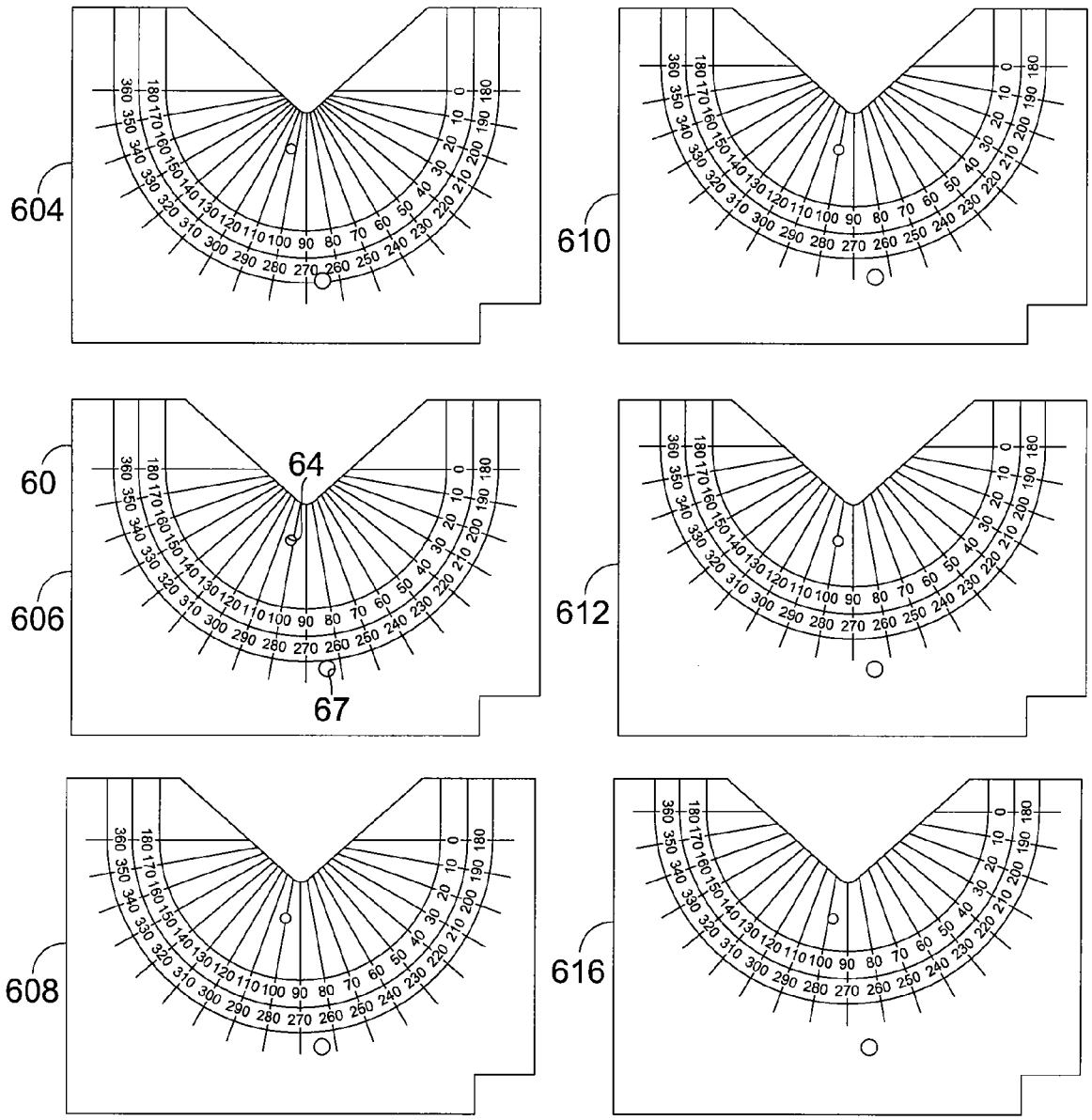
FIG. 6 shows a variety of different protractor plates which are usable with the twist angle tool so that different diameters of hose are usable.

FIG. 6 discloses a plurality of protractor plates 600, comprising a first plate 604, a second plate 606 (which is plate 60 selected for use as shown in FIGS. 1-2, 4, and 5), a third plate 608, a fourth plate 610, a fifth plate 612, and a sixth plate 614. Each of these plates have pin and screw receiving aperture positions (for receiving pin 64 and screw 66) such that when each plate is installed on the second support 14 its V-shaped notch will match up with the inside profile of the cross section of hose-receiving angle iron 86. Furthermore, each of plates 604, 606, 608, 610, 612, and 614 has a protractor arrangement with a reference center which matches up with the center axis of a commercially available hose of a particular diameter when that hose is placed in angle iron 82 on support 14. For example, protractor plate 604 is adapted for use with ¼ inch diameter hydraulic hose; plate 606 with ⅜ diameter hose; plate 608 with ½ inch diameter hose; plate 610 with ⅝ inch diameter hose; plate 612 with ¾ diameter hose; and plate 614 with 1 inch diameter hose.

It will now be described how the tool is used to install elbows at each end of a hose 20. First, an appropriate protractor plate should be selected from the group shown in FIG. 6 by matching the diameter of the hose to be manufactured with the proper plate. In some instances the protractor plate will be installed on support 14 before the support is installed on the trough. Alternatively, however, the protractor plate could be installed after the second support has been rigidly fixed to the trough as will be discussed in more detail below. This would most likely occur where support 14 is already installed on the trough because it has been used to produce other size hose or for other purposes. Regardless, a selection step will occur for the protractor plate. This will depend on the size of the hose that is being used. For each diameter sized commercially available hose, a different protractor plate will be used. Thus, e.g., one inch hose will have a specific protractor plate designated for it. One embodiment for an assortment of protractor plates can be seen in FIG. 6 in which it is evident that each protractor plate has a focal point. Each of these focal points will be at the center axis of the particular hose it is adapted to work with. Thus, given a hose diameter, the user will have to pick out the appropriate plate and fix it to second support either before or after the second support is installed on the trough.

At some point the end supports 12 and 14 should be installed on the trough if they are not already in place there. First support 12 is installed by causing the outer portion of the trough to be received in the receiving area between plates 72 and 73. The user should make sure that the trough is fully received in the receiving area and then thumb screw 77 should be screwed in such that trough 18 is engaged and first support 12 is rigidly supported upright thereon. Screws 56 rigidly hold set plate 50 to the first support. Thus, the first support is rigidly held on trough 18 and extends upward as shown in FIGS. 1-5.

The second support 14 is then installed at a distance to the right of first support 12. The first and second supports need to be spaced such that the ends of the hose extend barely past where the two plates will be. (See, e.g., FIG. 2.) Once the proper distance has been selected, the second support can be attached to the trough by loosening a thumb screw 84 such that the outer portion of trough 18 is receivable in a receiving area defined between gapped/welded plates 80 and 82 at the bottom of the support, and then tightening thumb screw 84 so that its middle vertical plate 78 holds the hose supporting angle iron 82 in the appropriate position where it is able to receive the hose 22. Thus, second support 14 is appropriately secured in position as shown in the figures.

In the case of a shorter hose, it may be possible that only first and second supports 12 and 14 are necessary. But with longer hoses, it will be desirable to install one or more intermediate supports like intermediate supports 512 and 514 so that the apparatus works effectively. In such a case these supports should be installed much like the first and second supports at equal distant points between the first and second support so that the hose is unable to sag within one to two feet from each of end supports 12 and 14. Any sag between intermediate supports 504 and 506 is of no consequence because it does not affect the axial twist of the hose. It is of course possible that more than two intermediate supports are provided, or that none are used. Thus, the limited number of intermediate supports used in FIG. 5, or their use at all are not to be considered necessary.

Once all the supports have been installed (and plates 50 and 60), the assembly 10 is set up to where it can be used to manufacture one or more hoses of the same diameter and length. Before placing it in the receiving areas 76 and 86 of the supports, the hose should be prepared by putting the uncrimped elbows on it. Before crimping, the elbows will be securely held on each end of the hose, but are loose enough to be manually rotated and slid on and off. Thus, a user is able to put them on and they should not fall off, but may be rotated to different angular positions relative to one another about the axis of the hose. This is true for most hose/elbow arrangements which are commercially available. After the elbows have been placed on the ends, the hose with its elbows on it will be placed in the receiving areas 76 and 86 of the supports 12 and 14 as shown in FIG. 1.

Next, the first elbow 30 at the first end will be rotated such that it is extending out at exactly horizontal towards blue side 54 of plate 50 as shown in all the figures for a 0-180 degree twist angle. For a 180-360 degree twist angle the elbow would be leveled horizontal in exactly the opposite direction (not shown) on red side 52 of plate 50.

The leveling process is rather simple given the construction of the installed tool 10. This is because the upper hex surface 34 of elbow 30 is flat. Thus it can be matched with another horizontal surface. In most cases, the best way to accomplish this is by matching it up with horizontal upper edge 62 on protractor plate 60 at the other end of the tool. In situations where this is not possible, it may be matched up with any other horizontal surface, such as the upper edge of the set plate 58.

Once the couplers have been adequately positioned to where they extend just beyond the plates on each side of the tool, the hose coupling should be clamped down using clamp 40 as shown in FIG. 1. This will prevent the hose coupling from rotating.

Regardless of whether elbow 30 is extending horizontally to the left (as shown) or right (not shown), its placement will provide a reference from which a twist angle can be drawn for the second elbow 26 on protractor plate 60 on the other side of the apparatus (at second support 14).

Now that the first coupling has been set in position, it is time to adjust the placement of the second elbow in the proper twist-angle relation. This is done by locating the appropriate angle on the protractor. This initially involves selecting the proper scale. This is made easy by the blue/red color coding provided. For 0-180 degree twist angles where the first elbow 30 is at horizontal towards blue as shown in FIG. 1, blue scale 110 (See FIG. 4) on plate 60 will be used and the second elbow 26 will be pointed towards the proper degrees indicated. (The twist angle for manufacture will be provided in specs from the customer.) Where first elbow 30 is pointed horizontally to the right on red side 52 for a 180-360 twist angle, red scale 111 on plate 60 will be used to line up second elbow 26 with the proper degree reference to set the twist angle.

Once the elbow has been pointed at the right position according to the appropriate scale on the protractor, the elbows are ready to be crimped onto the ends of the hose. To remove the hose, the clamp is released and the user should remove the hose without jarring the elbows to prevent displacement. The hose with elbows on each end is then carried to the crimping device.

Before crimping, it may be desirable to set the twist angles for any number of hoses. Especially where a number of hoses at the same length and with the same diameter are to be manufactured. If so, the twist angle settings can all be set at once before crimping.

For crimping one or more hoses, a conventional crimping device may be used. One skilled in the art will recognize that crimping devices provide uniform axially applied forces to the shell (e.g., shell 28 for first elbow 24—the shell for second elbow 26 is not shown) of the elbow to secure it permanently and in a sealed relationship with the end of the hose. Either of first or second elbows can be crimped first. The order is not important.

Once both elbows have been crimped to the hose, the manufacturing process for that hose is complete and the device is ready for delivery to a customer for installation on equipment or other purposes.

The above-described processes can be repeated for different lengths and/or different diameters of hose using the above processes.

As can be seen, the present invention and its equivalents are well-adapted to provide a new and useful twist-angle setting device and associated method of setting twist angles. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the order described.

The invention claimed is:

1. A device for setting twist angles on a hose having a first elbow at a first end of said hose and a second elbow at a second end of said hose, said device comprising:
   a clamping arrangement for securing one of said first elbow and said first end of said hose against rotation;
   a first support surface for supporting a first end of said hose and enabling said first elbow at said first end of said hose to be set at a first reference angular position;
   a second support surface for supporting a second end of said hose; and
   a first scale proximate said second end, said first scale adapted to enable a user to read and then set a first twist angle.

2. The device of claim 1 wherein said first scale is located on a protractor.

3. The device of claim 1 wherein said first support includes a reference plate which provides said first reference angle setting and a second optional reference angle setting.

4. The device of claim 3 wherein said first and second settings are at opposite horizontal positions.

5. The device of claim 4 wherein each of said first and second settings are associated with one of a first colored portion having a first color and a second colored portion having a second color, said first and second colored portions provided on said reference plate.

6. The device of claim 5 wherein said first scale includes said first color for the purpose of associating it with said first reference angular position, and a second scale which includes said second color and is proximate said second end and is adapted to enable a user to read and then set a second twist angle taken relative to said second reference angular position.

7. The device of claim 1 comprising:
   a second scale, said second scale adapted for use when said first elbow is set at a second reference angular position.

8. The device of claim 1 wherein said first and second supports are mountable on a table.

9. The device of claim 8 wherein said table has an angle iron trough and said first and second supports each have receiving areas and securing mechanisms such that said first and second supports are securable on said trough and stand upright.

10. The device of claim 9 comprising:
    a third support adapted to be secured on said trough between said first and second supports for the purpose of adding intermediate support to said hose.

11. The device of claim 10 comprising:
    a fourth support which is substantially similar to said third support, said fourth support adapted to be secured on said trough between said first and second supports, said fourth support further adding intermediate support to said hose.

12. The device of claim 1, said first scale existing on a first removable plate, said first plate being adapted to accommodate a first hose diameter.

13. The device of claim 12 including a second removable plate, said second plate adapted to accommodate a second hose diameter.

14. A method of setting a twist angle on a hose having a first elbow at a first end of said hose and a second elbow at a second end of said hose, said method comprising:

clamping one of said first elbow and said first end of said hose so that said first elbow does not rotate;
supporting said first end of said hose;
maintaining said first elbow at a first angular position;
supporting said hose at said second end;
providing a first scale proximate said second end; and
setting a first twist angle according to a reading made using said first scale.

15. The method of claim 14 comprising:
arranging said first scale on a protractor plate.

16. The method of claim 14 comprising:
identifying said first position on a plate along with a second position reference;
color coding said first and second references;
coloring said first scale so that it matches said first position; and
coloring a second scale so that it matches said second position.

17. The method of claim 16 comprising:
including said first and second scales on a first plate; and
adapting said first plate so that it is removable.

18. The method of claim 17 comprising:
offering a plurality of other removable plates which are substantially identical to said first plate except that said other plates are adapted to accommodate other hose diameters.

* * * * *